United States Patent
Eggert et al.

(10) Patent No.: US 11,220,261 B2
(45) Date of Patent: Jan. 11, 2022

(54) METHOD FOR ASSISTING A DRIVER, DRIVER ASSISTANCE SYSTEM, AND VEHICLE INCLUDING SUCH DRIVER ASSISTANCE SYSTEM

(71) Applicant: HONDA RESEARCH INSTITUTE EUROPE GMBH, Offenbach/Main (DE)

(72) Inventors: Julian Eggert, Offenbach (DE); Tim Puphal, Offenbach (DE); Malte Probst, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 68 days.

(21) Appl. No.: 16/746,007

(22) Filed: Jan. 17, 2020

(65) Prior Publication Data

US 2020/0231149 A1   Jul. 23, 2020

(30) Foreign Application Priority Data

Jan. 18, 2019 (EP) ..................................... 19152513
Jan. 30, 2019 (EP) ..................................... 19154475

(51) Int. Cl.
*B60W 30/09* (2012.01)
*B60W 30/095* (2012.01)
(Continued)

(52) U.S. Cl.
CPC ........ *B60W 30/0956* (2013.01); *B60W 30/09* (2013.01); *B60W 50/0097* (2013.01);
(Continued)

(58) Field of Classification Search
CPC ......... B60W 50/0097; B60W 60/0027; B60W 2555/60
See application file for complete search history.

(56) References Cited

U.S. PATENT DOCUMENTS

2015/0344030 A1* 12/2015 Damerow ......... B60W 30/0956
701/1
2017/0169709 A1   6/2017 Ando
(Continued)

FOREIGN PATENT DOCUMENTS

DE   10 2011 106176 A1   2/2012
DE   10 2010 044631 A1   3/2012
(Continued)

OTHER PUBLICATIONS

European Search Report dated Jul. 18, 2019 corresponding to European Patent Application No. 19154475.8.

*Primary Examiner* — Anshul Sood
(74) *Attorney, Agent, or Firm* — Squire Patton Boggs (US) LLP (57) ABSTRACT

The present invention relates to a method for use in a driver assistance system of an ego-vehicle. The method supports driving of the ego-vehicle and comprises the steps of retrieving a priority relationship between the ego-vehicle and at least one traffic participant involved in a traffic situation; selecting a prediction model for the at least one traffic participant depending on the priority relationship; predicting at last one hypothetical future trajectory for the ego-vehicle and, based on the selected prediction model, at last one hypothetical future trajectory for the at least one traffic participant; and calculating a behavior relevant score for ego-vehicle based on the calculated hypothetical future trajectories.

11 Claims, 7 Drawing Sheets

(51) Int. Cl.
*B60W 50/00* (2006.01)
*B60W 60/00* (2020.01)

(52) U.S. Cl.
CPC ..... *B60W 60/0027* (2020.02); *B60W 2520/10* (2013.01); *B60W 2552/05* (2020.02); *B60W 2552/20* (2020.02); *B60W 2554/402* (2020.02); *B60W 2554/802* (2020.02); *B60W 2555/20* (2020.02); *B60W 2555/60* (2020.02)

(56) References Cited

U.S. PATENT DOCUMENTS

2019/0152490 A1* 5/2019 Lan .................. B60W 30/0956
2019/0329768 A1* 10/2019 Shalev-Shwartz ... G05D 1/0223
2019/0369616 A1* 12/2019 Ostafew ............. G01C 21/3658

FOREIGN PATENT DOCUMENTS

EP          2 950 294 A1   12/2015
EP          3 361 466 A1    8/2018
WO    WO 2018/132614 A2    7/2018

* cited by examiner

METHOD FOR ASSISTING A DRIVER, DRIVER ASSISTANCE SYSTEM, AND VEHICLE INCLUDING SUCH DRIVER ASSISTANCE SYSTEM

BACKGROUND

Field

The invention relates to a method and system for assisting a driver in driving a vehicle and a vehicle comprising such system. More specifically, the invention relates to a driver assistance system and method for actively controlling a vehicle based on predictions of a behavior of a detected object and/or outputting information to the vehicle's driver.

Description of the Related Art

During the last years, driver assistance systems have been developed in order to increase the comfort for a driver and the safety of driving. Such driver assistance systems are capable of sensing the environment around a vehicle, in particular other traffic participants, and providing information to the driver or performing autonomous or partially autonomous driving. In order to do so, the vehicles are equipped with sensors like radar and/or lidar sensors and/or with image processing systems that include cameras for recognizing objects in the environment of the vehicle. In particular, for autonomous driving or partially autonomous driving, a future behavior of other traffic participants must be estimated that is relevant for the correct determination of a traffic situation.

A driver assistance system, in which trajectories for the own vehicle (ego-vehicle) and another traffic participant are predicted, and a relation between the trajectories is used to describe a risk of the ego-vehicle for moving further on its trajectory, is described in DE 102011106176 A1.

EP 2950294 A1 discloses a driver assistance system, in which a calculated trajectory of the ego-vehicle is varied to generate a plurality of ego-trajectory alternatives, a critical event risk map is generated based on the ego-trajectory alternatives and a calculated trajectory of the other traffic participant, and a path for the ego-vehicle having low risk and high efficiency is estimated based on the critical event risk map.

Both approaches can be applied very well to traffic situations where possible behavior alternatives for the traffic participant are limited, but encounter their limitations in traffic situations where the traffic participant passes intersections, junctions or roundabouts.

DE 102010044631 A1 discloses a method for determining a collision risk of the ego-vehicle, in which all possibilities for the traffic participant to pass a crossroad are determined and evaluated with respect to the collision risk assuming a possible future behavior of the ego-vehicle. However, such method is complex and expensive.

SUMMARY

It is an object of the present invention to overcome the above-mentioned drawbacks and to provide an improved method for assisting a driver in driving a vehicle. More specifically, it is an object of the invention to provide a method for use in a driver assistance system of an ego-vehicle, a driver assistance system, and a vehicle comprising such driver assistance system, with which the behavior of the ego-vehicle can be planned with low effort and costs, and which produces safe, useful, and comfortable ego-trajectories.

This object is achieved by a system and a method according to the enclosed independent claims. Advantageous features of the present invention are defined in the corresponding dependent claims. According to the present invention, the method supports driving of the ego-vehicle, and comprises the steps of sensing at least one other traffic participant in the environment of the ego-vehicle and involved in a traffic situation, determining a priority relationship between the ego-vehicle and at least one traffic participant, selecting a prediction model for the at least one traffic participant depending on the priority relationship, predicting at last one hypothetical future trajectory for the ego-vehicle, and, based on the selected prediction model, at last one hypothetical future trajectory for the at least one traffic participant, calculating a behavior relevant score for ego-vehicle based on the calculated hypothetical future trajectories.

With the present invention, the most likely future behavior and, thus, trajectory and velocity of a traffic participant is iteratively predicted/calculated based on a prediction model selected based on the priority relationship between the ego-vehicle and the traffic participant. This enables to plan a future ego-vehicle behavior which is safe (low risks), useful (the ego-vehicle performs movement), and has a high comfort (low jerk, constrained acceleration). The method is computationally efficient because it uses only a single, iteratively changed prediction for the other traffic participant.

The priority relationship can be estimated based on road maps indicating priority at intersections (e.g., Y, T and X junctions as well as roundabouts) and highway mergings (entering plus leaving ramps and overtaking), and/or based on vehicle type/state (emergency vehicle), stop lines, road signs and/or traffic lights detected by at least one optical sensor of the ego-vehicle. Generally, the priority relationship between the ego-vehicle and one other traffic participant may be determined in an arbitrary way, which can even include information obtained from road infrastructure. For example, traffic lights may transmit their status to the ego-vehicle so the method can take into consideration the correct current status even at intersections where the priority relationship may change from time to time. Further, it is to be noted that the priority relationship is considered between the ego-vehicle and one further vehicle. In a situation where there are a plurality of other traffic participants, a plurality of priority relationships will be determined. Each of these relationships will result in selection of a dedicated prediction model used for future movement prediction of the respective other traffic participant.

Further, when the ego-vehicle and the at least one traffic participant follow the same path, which means that they drive on the same lane, the priority relationship can be estimated by determining whether the ego-vehicle precedes or succeeds the at least one traffic participant. A prediction model defining a constant velocity for the at least one other traffic participant within the prediction horizon, is selected in the selecting step. The prediction horizon is a time interval for which a prediction is performed, starting from the current point in time.

Alternatively or in addition, when it is determined that the trajectory of the ego-vehicle and the trajectory of the at least one traffic participant intersect or merge, a prediction model defining a delayed change of velocity for the at least one traffic participant within the prediction horizon is selected in the selecting step.

In addition, when it is determined that the ego-vehicle has right of way over the at least one traffic participant, a delayed decrease of velocity as said delayed change of velocity can be selected in the selecting step, and when it is determined that the at least one traffic participant has right of way over the ego-vehicle, a delayed increase of velocity as said delayed change of velocity can be selected in the selecting step.

Preferably, in said prediction model defining a delayed change of velocity, the velocity changes up to a predetermined value or for a predetermined period and is then constant for the rest of the prediction horizon.

In the selecting step, at least one of the predetermined value, the delay and the change of the velocity can be set based on at least one of: road conditions, road geometry, weather conditions, speed limit, type and/or state of the at least one traffic participant, type and/or state of the ego-vehicle, distance between the ego-vehicle and the at least one traffic participant, and a speed with which the ego-vehicle and the at least one traffic participant move towards each other.

The behavior relevant score can be calculated as risk and indicate, for the hypothetical future trajectory of the ego-vehicle, collision probability, collision severity, product of collision probability and collision severity, Time-of-Closest-Encounter, Time-To-Closest-Encounter, Position-of-Closest-Encounter or Distance-of-Closest-Encounter.

Alternatively or in addition, the behavior relevant score can be modulated based on a monotonically decreasing function, which takes into account the priority relationship between the ego-vehicle and the other traffic participant and/or the effect that events lying more ahead in the future get less probable.

Preferably, functional form and/or parameters of the monotonically decreasing function are set based on at least one of: the priority relationship, road conditions, road geometry, weather conditions, speed limit, type and/or state of the at least one traffic participant, type and/or state of the ego-vehicle, distance between the ego-vehicle and the at least one traffic participant, and a speed with which the ego-vehicle and the at least one traffic participant move towards each other. Most important is the adaptation of the functional form and/or parameters of the monotonically decreasing function based on the priority relationship.

According to the present invention, a driver assistance system is configured to carry out the method steps as outlined above. The system determines on its own, or gets it as input, the current positions and velocities of one or more other traffic participant(s), which are relevant for the intended further driving behavior of the ego-vehicle. The system makes predictions about the relevant other traffic participants' future positions/velocities on their respective given paths (e.g. from a map). Given these predictions, and an ego-vehicle's trajectory and velocity profile, the system calculates the corresponding behavior relevant score (including at least one of: collision risk, curvature, utility, and/or drive comfort aspects) and selects or determines the ego vehicle behavior, e.g., by calculating the behavior relevant score for a plurality of alternative ego-vehicle's velocity profiles and/or trajectories, and selecting the best among them. Determination may alternatively be performed by using an optimization algorithm to iteratively improve one or more trajectories and/or velocity profiles.

According to the present invention, a vehicle comprises the driver assistance system as outlined above.

BRIEF DESCRIPTION OF THE DRAWINGS

The invention will now be explained in more detail with reference to the accompanying drawing, wherein.

DETAILED DESCRIPTION

The same features are denoted by the same reference signs throughout all figures.

Figure 1:
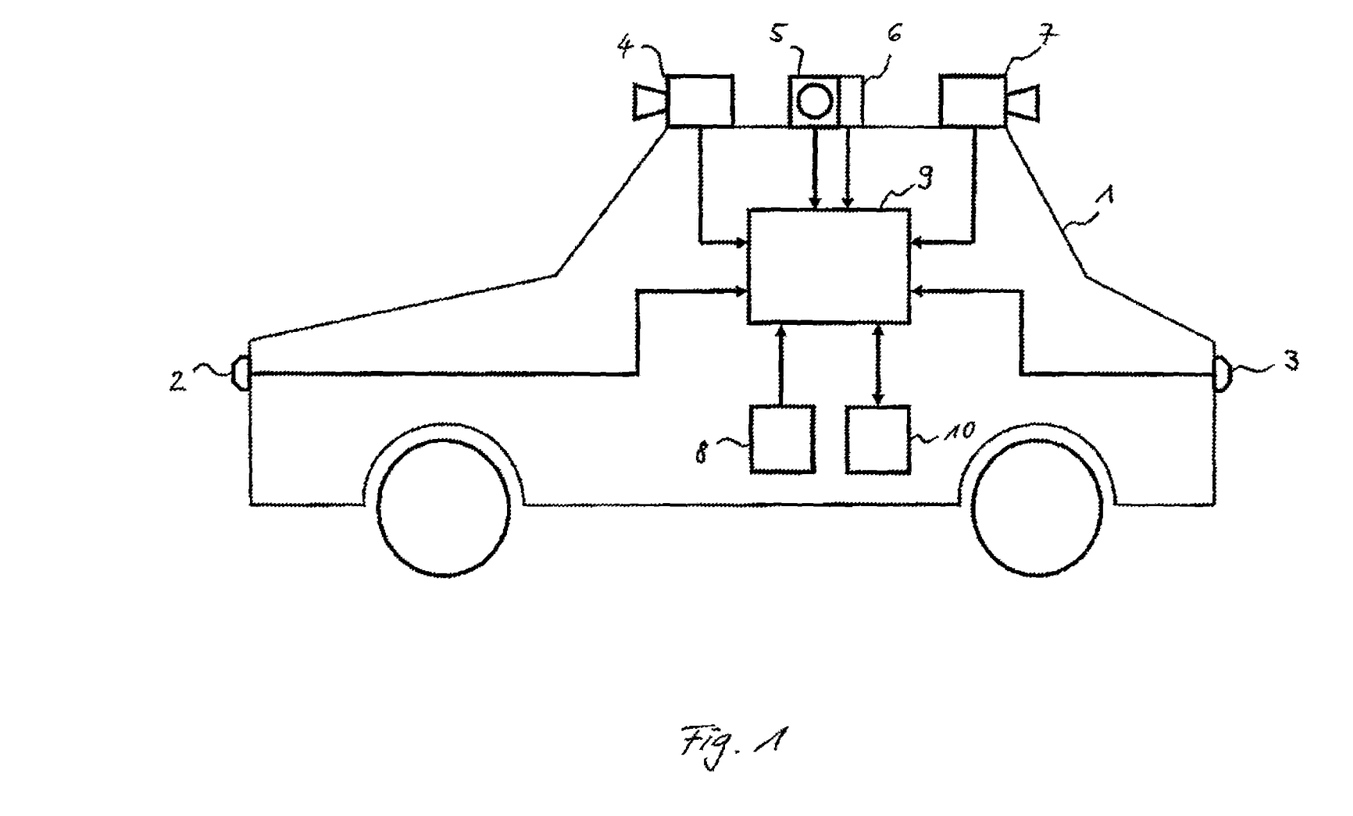
FIG. 1 shows a vehicle according to an embodiment of the present invention.

FIG. 1 shows a side view of an ego-vehicle 1, equipped with the inventive system for assisting a driver in driving the ego-vehicle 1. The assistance may be provided in the form of information output, especially warnings or recommendations, to the driver in dangerous situations with respect to other traffic participants and/or in the form of autonomously or partially autonomously driving the ego-vehicle 1.

The ego-vehicle 1 may be any type of vehicle including, but not limited to, cars, trucks, motorcycles, busses, and reacts to surrounding objects (traffic participants), such as pedestrians, automobiles, and bicycles.

In FIG. 1, a front radar 2, a rear radar 3 and cameras 4 ... 7 sensing the environment around the ego-vehicle 1 are mounted on a front surface of the ego-vehicle 1, a rear surface of the ego-vehicle 1, and the roof of the ego-vehicle 1, respectively. The cameras 4 ... 7 preferably are positioned so that a 360° surveillance around the ego-vehicle 1 is possible. Alternatively or in addition, a stereo camera system and/or lidar sensors can be mounted on the ego-vehicle 1. A position sensor 8, e.g. a GPS navigation device, is mounted on the ego-vehicle 1 and detects the position of the ego-vehicle 1. The driver assistance system of the ego-vehicle 1 further comprises a computer 9 that receives or acquires the signals from the front radar 2, the rear radar 3, the cameras 4 ... 7, the position sensor 8, and status data of the ego-vehicle 1, such as vehicle speed, steering angle, engine torque, brake actuation, from of at least one vehicle controller 10 (ECU).

Figure 2:
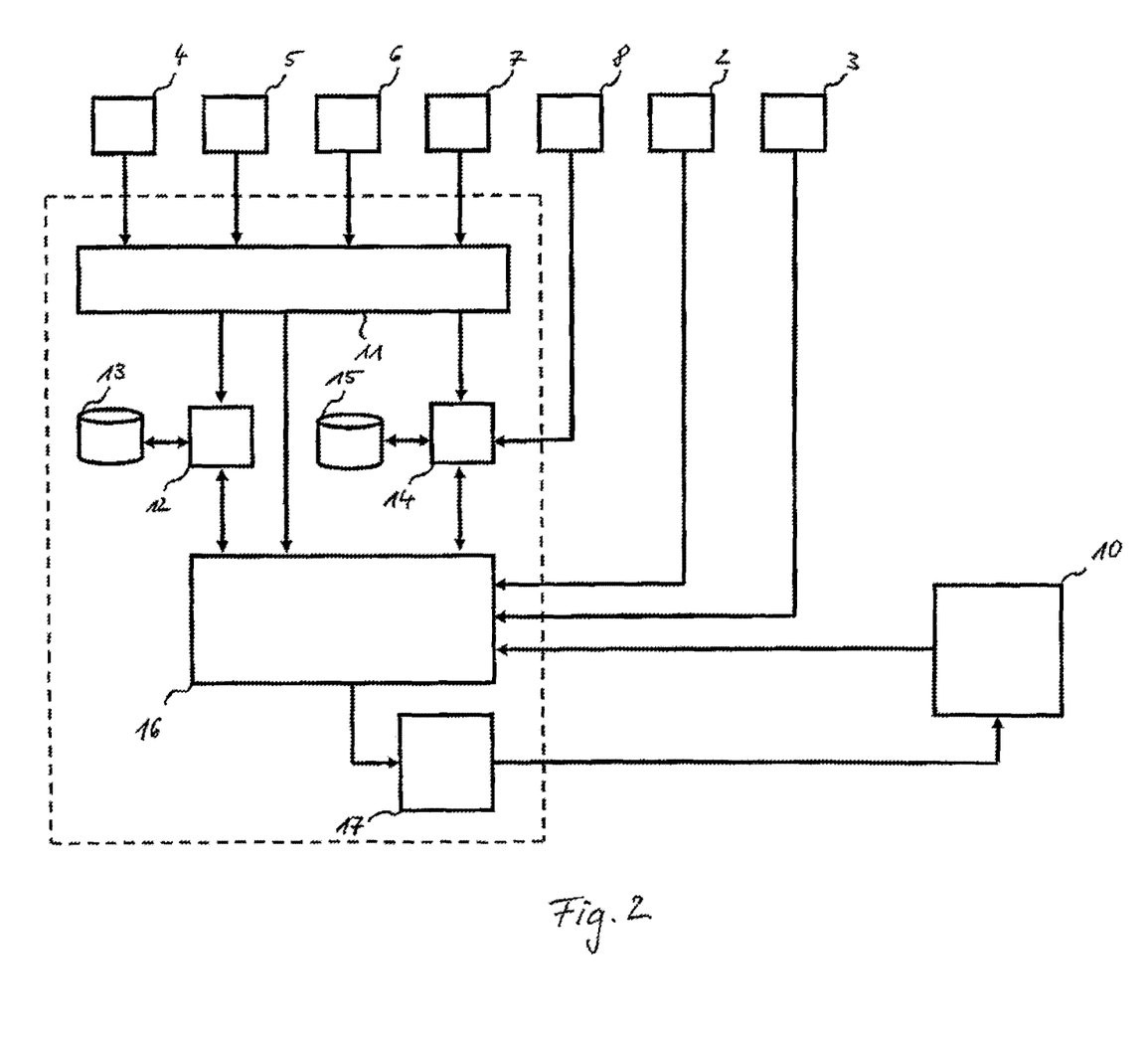
FIG. 2 shows a schematic structural diagram of the driver assistance system contained in the vehicle shown in FIG. 1.

FIG. 2 illustrates functional components of the computer 9. As a specific example, an already existing computer 9 or processor used for processing signals of an adaptive cruise control may be configured to implement the functional components described and discussed below. The computer 9 comprises an image processing module 11, an object classification module 12, an object database 13, a priority determination module 14, a map database 15, a prediction module 16, and a behavior control/determination module 17. Each one of the modules is preferably constituted in software that is run on a processor or in dedicated hardware circuits.

The image processing module 11 receives the signals from the cameras 4 . . . 7, and identifies the lane of the ego-vehicle 1 and objects, course of the road and traffic signs in the environment of the ego-vehicle 1. The classification module 12 classifies the identified objects and transmits the result to the prediction module 16, wherein at least the technically feasible maximum speed and acceleration of a vehicle identified by the image-processing module 11 and assessed as relevant by the prediction module 16 are determined based on the object database 13. The object database 13 stores the maximum speed and acceleration for each of vehicle classes, e.g. trucks, pick-ups, sports cars, and motorcycles and/or stores identification information (brand, model, etc.) of a plurality of real vehicles in combination with its maximum speed and acceleration.

Figure 3:
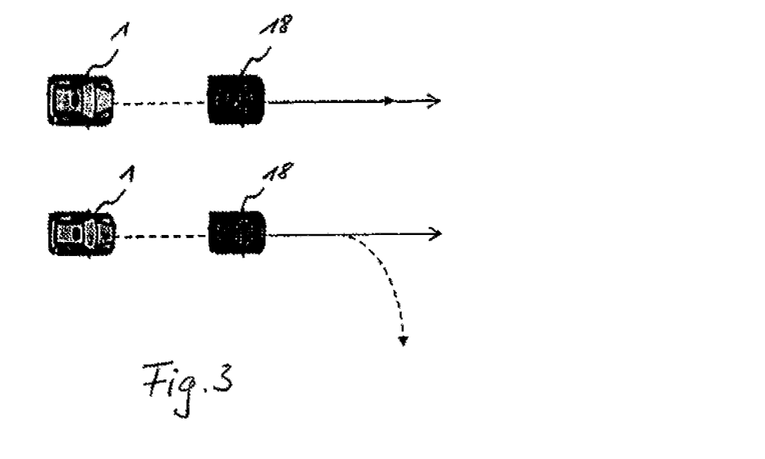
FIG. 3 shows a first type of traffic situations.
Figure 4:
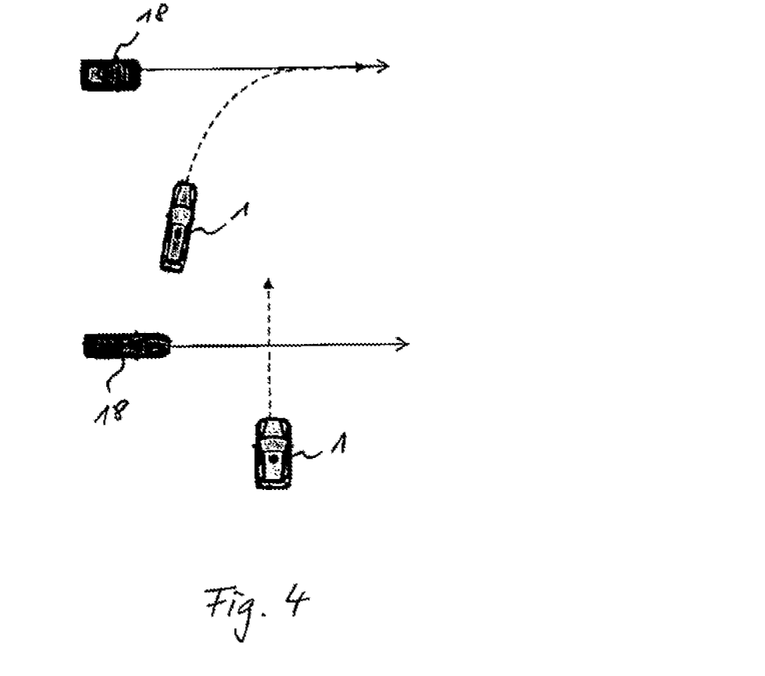
FIG. 4 shows a second type of traffic situations.

The priority determination module 14 individually determines a priority relationship between the ego-vehicle 1 and each traffic participant identified by the image-processing module 11 and involved in the traffic situation to be evaluated by the prediction module 16. The traffic situations may be classified into at least two categories by the priority determination module 14: a longitudinal case, in which the ego-vehicle 1 and the other traffic participant 18 drive on the same path/lane and in the same direction, i.e. one vehicle follows the other one, as shown in FIG. 3; and a lateral case, in which, at the current point in time, the ego-vehicle 1 and the other traffic participant 18 do not follow the same path, but the future paths intersect/merge within the prediction horizon, as shown in FIG. 4. Thus, currently the moving directions of the ego-vehicle and the respective other traffic object are different. Exemplary, scenarios could be intersections, highway mergings and more.

In the lateral case, the priority determination module 14 determines whether the ego-vehicle 1 has right of way over the other traffic participant 18, or the other traffic participant 18 has right of way over the ego-vehicle 1 based on the lane, the position of the traffic participant 18, the course of the road, and/or the traffic signs identified by the image processing module 11. Alternatively or in addition, the priority determination module 14 performs the determination based on a position signal of the position sensor 8 and map data of the map database 15 that indicates the priority rules for the road network.

The prediction module 16 calculates at least one hypothetical future trajectory for the ego-vehicle 1 based on the status data received from the vehicle controller 10, the information received from the image-processing module 11, the signals received from the front radar 2 and the rear radar 3, and, in the case of autonomously driving, information on the driving route. The trajectory indicates the future positions of the ego-vehicle 1.

According to the present invention, the prediction module 16 selects a prediction model for the traffic participant 18 depending on the priority relationship determined by the priority determination module 14. Further, the maximum speed and acceleration may be determined by the classification module 12, wherein, when the ego-vehicle 1 and the traffic participant 18 follow the same path, as shown in FIG. 3, the selected prediction model defines a constant velocity over the prediction horizon. This means that for a prediction performed based on a current situation, the other vehicle is assumed to move further with a constant speed for a time interval corresponding to the prediction horizon.

On the other hand, when the trajectory of the ego-vehicle 1 and the trajectory of the traffic participant 18 intersect or merge, as shown in FIG. 4, a prediction model that defines a delayed change of velocity is selected. In particular, a delayed decrease of velocity as the delayed change of velocity is set, if the ego-vehicle 1 has right of way over the traffic participant 18. A delayed increased of velocity as the delayed change of velocity is defined in the prediction model that is selected if the traffic participant 18 has right of way over the ego-vehicle 1.

Figure 5:
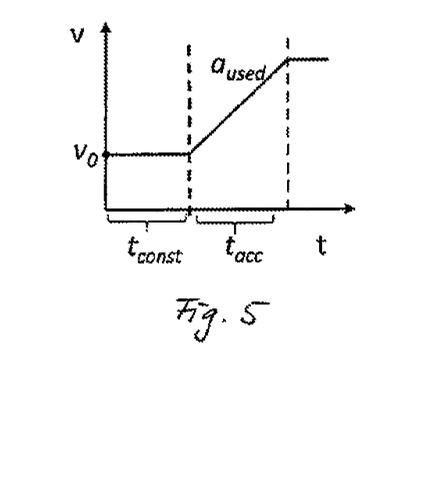
FIG. 5 shows a velocity profile of a prediction model according to an embodiment of the present invention.
Figure 6:
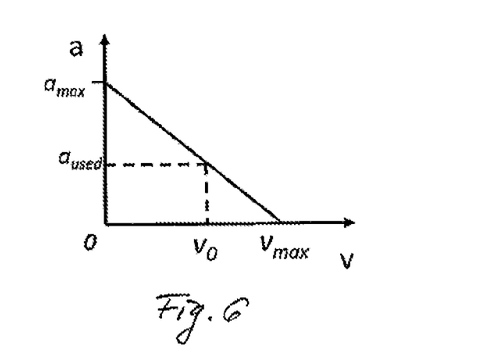
FIG. 6 shows a diagram for determining acceleration parameter necessary to determine the velocity profile shown in FIG. 5.

FIG. 5 shows a prediction model, in which the graph of the velocity of the traffic participant 18 over time shows a delayed increase of velocity. According to this model, the prediction module 16 predicts the traffic participant 18 to drive with a constant velocity $V_0$ for a short period $t_{const}$, then to increase the velocity with an acceleration of $a_{used}$ for a period $t_{acc}$, and to drive with a constant velocity for the rest of the prediction horizon, wherein $V_0$ is the current velocity of the traffic participant 18, $t_{const}$ and $t_{acc}$ are parameters and $a_{used}$ depends on the current velocity $V_0$, the maximum speed $V_{max}$, and the maximum acceleration $a_{max}$, as shown in FIG. 6. It is preferred that the acceleration $a_{used}$ is constant over $t_{acc}$. The maximum speed $V_{max}$ and the maximum acceleration $a_{max}$ of the traffic participant 18 are determined by the classification module 12 and define the endpoints of the line in the diagram shown in FIG. 6, in which the acceleration $a_{used}$ is $a_{max}$ at $V_0=0$, and the acceleration $a_{used}$ is 0 at the $V_0=V_{max}$. $V_{max}$ is the maximum velocity up to which acceleration of the traffic participant 18 is assumed at all. In case that there is a speed limit, the resulting velocity profile may be checked against the speed limit. If a conflict between $V_{max}$ and the speed limit is determined, the velocity profile may be adapted, for example, by cutting the acceleration accordingly. Information on an applicable speed limit may be obtained from map data, sensor data, or infrastructure communication.

In the prediction model in which the velocity of the traffic participant 18 defines a delayed decrease of velocity, the prediction module 16 predicts the traffic participant 18 to drive with a constant velocity $V_0$ for a short period $t_{const}$, then to decrease the velocity with acceleration of $a_{used}$ for period $t_{acc}$ and to drive with a constant velocity for the rest of the prediction horizon, wherein $V_0$ is the current velocity of the traffic participant 18. Here, a minimal velocity can be applied in the prediction as well which is usually 0.

In both prediction models, $a_{used}$, $V_{max}$, $a_{max}$, $t_{const}$ and/or $t_{acc}$ can be set based on the road conditions (e.g., asphalt, rubble, ice), road geometry (e.g., curvature), weather conditions (e.g., raining, low altitude of sun, foggy), speed limit, type and/or state of the traffic participant 18, type and/or state of the ego-vehicle 1, distance between the ego-vehicle 1 and the traffic participant 18, a speed with which the ego-vehicle 1 and the traffic participant 18 move towards each other, and/or observed driver state (gaze, distraction).

The prediction module 16 predicts a future behavior for the traffic participant 18 based on the selected prediction model, the information received from the image-processing module 11 and the signals received from the front radar 2 and the rear radar 3 and calculates a behavior relevant score for ego-vehicle 1 based on the calculated trajectories of ego-vehicle 1 and the traffic participant 18. It is to be noted that most part of the future behavior prediction is performed as known in the prior art. This means that the most likely future trajectory is identified. According to the invention, however, the prediction is based on a specific prediction model that comprises a definition of a speed profile over the prediction horizon. The specific prediction model is selected based on an identified priority.

The behavior relevant score is relevant to plan/control the behavior of the ego-vehicle 1 and could be negatively correlated to the safety of the ego-trajectory (i.e., a high collision risk corresponds to a high behavior relevant score). For example, the distance between the ego-vehicle 1 and the traffic participant 18 or a product of collision probability and collision severity for each point in time can be used to calculate the behavior relevant score.

Figure 7:
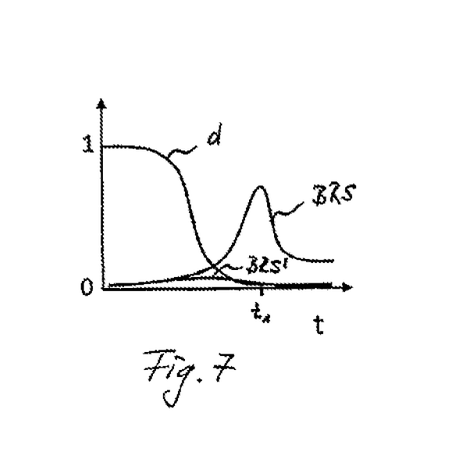
FIG. 7 illustrates the generation of the behavior relevant score according to an embodiment of the present invention

As shown in FIG. 7, the behavior relevant score BRS is a function over the time within the prediction horizon during which the prediction is considered to remain valid. In FIG. 7, the function of the behavior relevant score BRS indicates a high risk in the distant future (maximum at time $t_1$). In order to determine an ego-vehicle behavior, the BRS for all other traffic participants that are considered for behavior planning, the respective BRS is integrated over the prediction horizon. The final determination of the best ego-vehicle behavior is then based on the sum of all integrated behavior relevant scores BRS of the other traffic participants.

This approach can be improved when the BRS is weighed over time. To weight the behavior relevant score BRS as a function of time, a weighted behavior relevant score BRS' can be calculated by multiplying BRS with a monotonically decreasing function d. With the weighted behavior relevant score BRS', the risk is fully taken into account close to the current time (function d~1), but not at the end of the prediction horizon (function d→0), which takes into account the effect that events lying more ahead in the future are less probable. This modification makes the system more robust against overvaluing inferior participants behavior. The functional form and/or parameters of the monotonically decreasing function d can be set based on road conditions, road geometry, weather conditions, speed limit, type and/or state of the traffic participant 18, type and/or state of the ego-vehicle 1, distance between the ego-vehicle 1 and the at least one traffic participant 18, and a speed with which the ego-vehicle 1 and the at least one traffic participant 18 move towards each other.

Preferably, the functional form and/or parameters of the monotonically decreasing function d is set based on the priority relationship between the ego-vehicle 1 and the traffic participant 18 and/or the traffic situation (longitudinal or lateral case). For example, if the traffic participant 18 has right of way over the ego-vehicle 1, the behavior relevant score BRS is not weighted by the function d, or the function d is slowly descending so that the risk is fully or almost fully taken into account (function d=1 or d~1) and, if the ego-vehicle 1 has right of way over the traffic participant 18, the behavior relevant score BRS is weighted by the monotonically decreasing function d so that the traffic participant 18 is only considered if he comes critically close. Since the probability that the traffic participant 18 does not perceive the ego-vehicle 1 is greater in intersection scenarios (lateral case), the function d can stronger decrease in the longitudinal case than in the lateral case.

As the prediction is updated at regular time intervals, for example 100 ms, the ego-vehicle behavior will regularly be recalculated. This results in an improved comfort and safety, because the updated prediction will automatically adapt to the current other traffic participant's speed.

In order to determine the best behavior for the ego-vehicle 1, prediction module 16 can calculate a plurality of ego-trajectories and choose the one which results in the best behavior relevant score, as disclosed in EP 2950294 A1, or iteratively change the ego-trajectory and/or velocity profile to optimize the behavior relevant score. The prediction module 16 outputs information on the finally determined ego-trajectory (velocity profile) to the behavior determination module 17 that determines a behavior of the ego-vehicle based on this information, generates corresponding driving control signals for executing the determined behavior by controlling acceleration, braking and/or steering of the ego-vehicle 1, and outputs the generated control signals to the vehicle controller 10. Alternatively or in addition, warning and/or recommendations for drivers of the ego-vehicle 1 can be generated and outputted by the behavior determination module 17.

The described steps are processed repeatedly and the parameter of the selected prediction model are adapted to changes in the environment and/or to behavior change of the traffic participant 18.

In the prediction model, the constant-velocity period $t_{const}$ leads to safe short-time behavior of ego-vehicle 1 (no assumption of instantaneous braking) if the traffic participant 18 is disobeying the traffic rules and the acceleration/deceleration period tact leads to better predictions, given that the traffic participant 18 behaves according to the traffic rules, wherein the velocity-dependent acceleration leads to proper behavior prediction for different speeds because a vehicle which is standing/stopped is assumed to accelerate strongly so that the ego-vehicle 1 cannot plan to go first and a vehicle which is already fast, is not assumed to accelerate strongly so that the ego-vehicle 1 will plan to go afterwards, with a sufficient gap.

Figure 8:
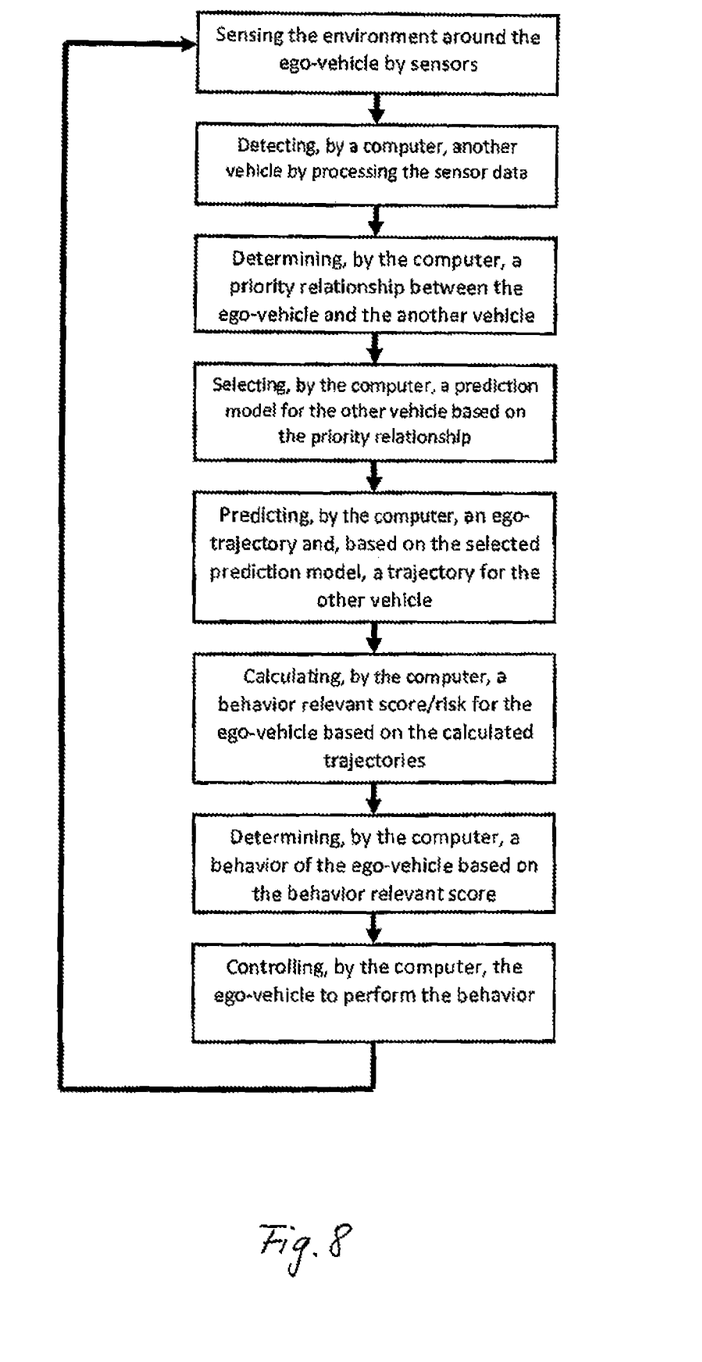
FIG. 8 shows a flowchart of the method according to an embodiment of the present invention.

FIG. 8 shows a very simplistic flowchart showing the single steps performed by the realization of the method described in detail above.

Figure 9:
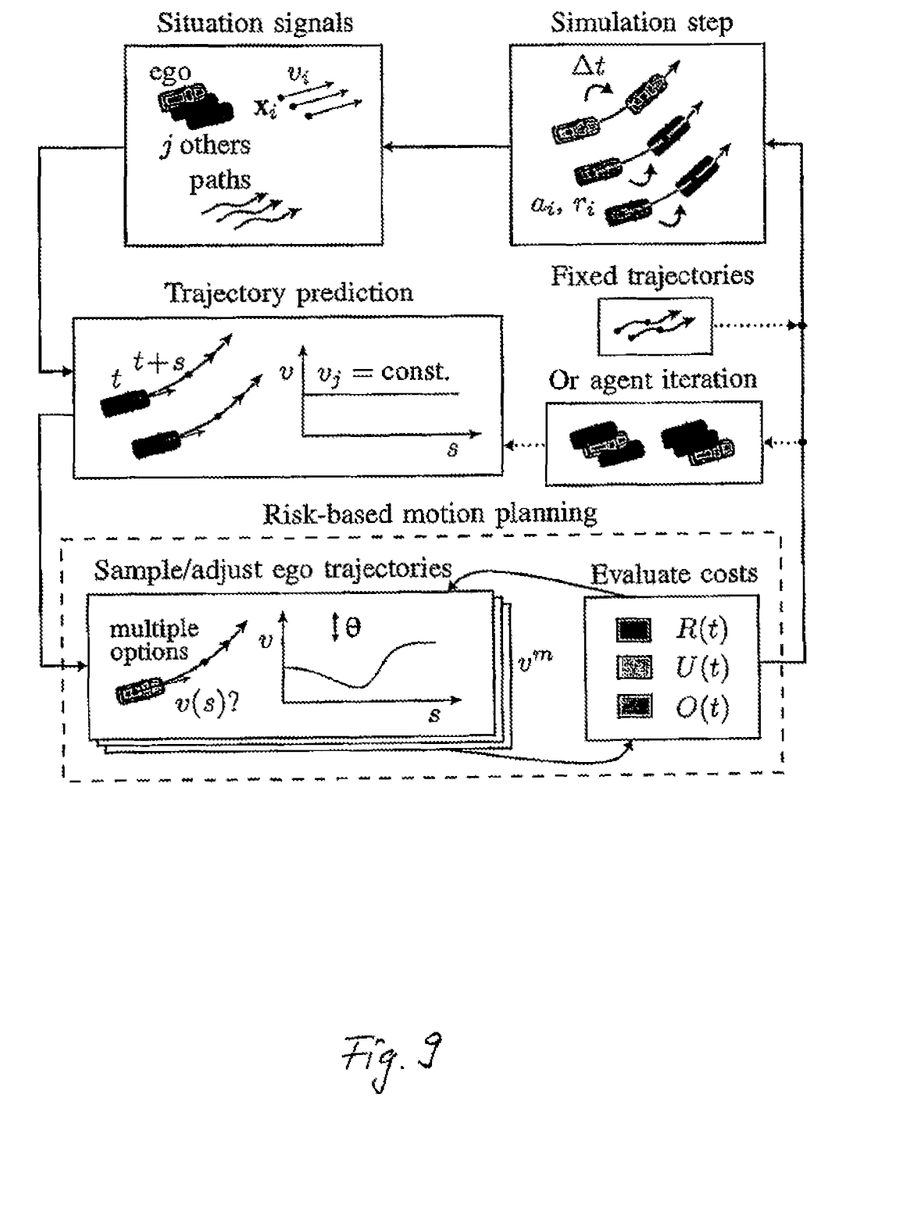
FIG. 9 shows a process of predictive velocity optimization according to an embodiment of the present invention.

The predictive velocity optimization for the ego-vehicle 1, which is performed by the prediction module 16 and which allows to find ego velocity profiles minimizing risks from curves and all involved vehicles while maximizing utility (needed time to arrive at a goal) and comfort (change and duration of acceleration) under the presence of regulatory conditions, is described in the following.

FIG. 9 shows the concept of predictive velocity optimization, in which evaluation of risk, utility, and comfort follows adjusting multiple future ego velocity profiles by planning motion in structured environments, by searching the velocity space v over future times s. As shown in FIG. 9, the Risk Optimization Method (ROPT) initially receives latest positions $x_i$, velocities $v_i$, and given map paths for the ego-vehicle 1 (subscripted by ego) and $N_o$ other vehicles (subscripted by j) so that the traffic situation consists thereby of $N_o+1$ participants indexed with i. Without prior knowledge, other trajectories are predicted on their respective paths with constant velocity up to a prediction horizon $s_h$. The goal of ROPT is now to optimize parameters θ from multiple velocity profiles $v^m$ for the ego-vehicle. For this purpose, it is alternated between adjusting θ and evaluating risks R(t), utility U(t) and comfort O(t) of the arising dynamic scene for the current time t. Once a defined cost threshold is satisfied for each sample, $v^m$ with the lowest cost is chosen and executed within a simulation step Δt to obtain accelerations $a_i$ and jerks $r_i$. In this process, the simulator either updates other vehicles from measured fixed trajectories or controls them with their own planners.

Figure 10:
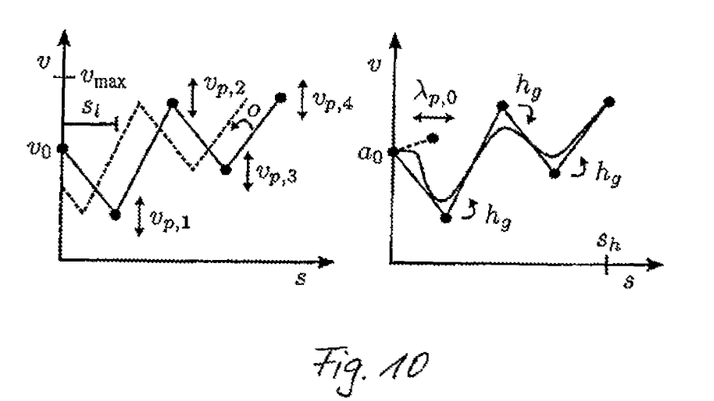
FIG. 10 shows parameters and shift of velocity snake (left side) and lag implementation and corner smoothing (right side)

In complex scenarios with more than one risk source (i.e., driving in curve while crossing crowded intersection), the cost functional is non-convex. To overcome local minima, velocity shapes with high degrees of freedom are necessary. For ROPT n=4 segments having fixed length $s_f$=2.5 sec but variable end velocities $v_{p,n}$ are selected as shown in the left diagram of FIG. 10, in which p stands for one parameter in the parameter set θ. This allows to proactively plan tactical maneuvers, such as consecutively braking, keeping velocity, and accelerating back. After each step Δt, the resulting "snake" profile is then time-shifted by an offset o to match the new start velocity $v_0$ with same slopes $v_{p,n}$. Because v(s) is discontinuous, an adjustable first lag $\lambda_{p,0}$ for the acting acceleration $a_0$ is introduced. The right diagram of FIG. 10 shows that the following ramp transitions are supplementary smoothed with a Gaussian filter $h_g$ for reduced peaks.

ROPT can use the non-gradient Powell's optimization method, which iteratively fits for θ a quadratic function to three evaluation points and finds its vertex. Soft constraints are set with penalizations for exceeding the minimal/maximal values $v_{max}$, $\lambda_{min}$, $a_{min}$ and $a_{max}$. Altogether, the optimization problem can thus be formulated as $$\min f(v_{p,1}, v_{p,2}, v_{p,3}, v_{p,4}, \lambda_{p,4}) = R(t) - U(t) - O(t) \quad (1)$$

subject to $v_{p,n} \leq v_{max}$, $\lambda_{p,0} \geq \lambda_{min}$, $a_{min} \leq a_{p,n} \leq a_{max}$, wherein $(v_{p,1}, v_{p,2}, v_{p,3}, v_{p,4}, \lambda_{p,4})$ are decision variables; R(t)–U(t)–O(t) is a fitness function $f$; and $a_{p,n}$ are segment accelerations.

Besides optimized snakes, fixed trajectories can be sampled in the implementation: one constant velocity trajectory as well as one emergency stop and one acceleration trajectory. All trajectories are always evaluated in terms of their fitness, and one is selected for behavior execution. An hysteresis can be introduced so that a switch to a different trajectory $v^m$ is exclusively done when the risk R(t) of the new trajectory is relatively and absolutely smaller for a set period of time.

A requirement for both the longitudinal case and the lateral case is that the superior entity (leading or prioritised vehicle) does not brake or accelerate unreasonably. Otherwise in law, the share of the blame and costs might be divided among the involved parties. With the present invention, ROPT thus a) categorizes the path relation between vehicles plus matches them to legal right-of-ways (e.g. front-before-back, right-before-left) and b) modifies appropriately the behavior relevant prediction model of other vehicles (i.e., altering the influence on own risk and calculating different trajectories).

Figure 11:
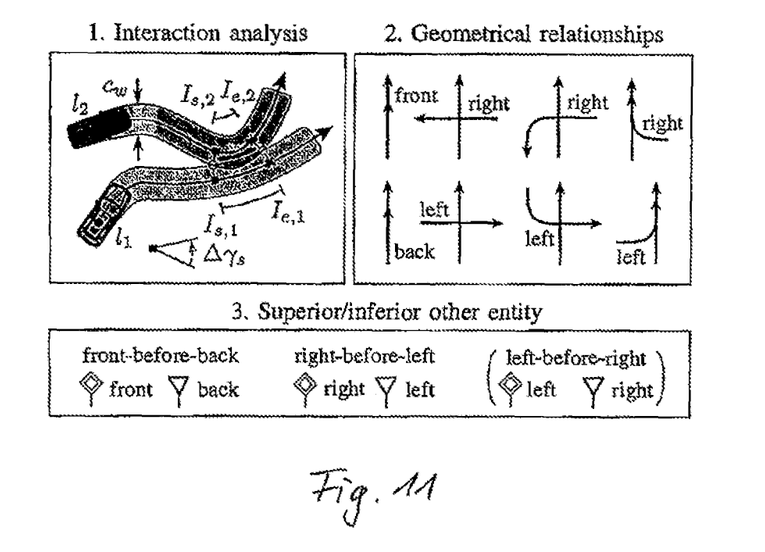
FIG. 11 shows the individual steps for regulatory risk estimation according to an embodiment of the present invention.

A generic driving scene of two traffic participants (TP) with i=1, 2 is illustrated in FIG. 11, in which, as a starting point, trail corridors have widths $c_w$ from their current longitudinal position $l_1$ and $l_2$ until the trajectory end. Subsequently, the zone of interaction is given when both corridors intercept. In FIG. 11, start and end points are projected to each path and separate boundaries $I_{s,1}$, $I_{e,1}$ for TP1 and $I_{s,2}$, $I_{e,2}$ for TP2 are set. In the longitudinal case, one or both TP's are in the interaction zone at moment t. Comparing the positions $l_i$ allows to assign TP2 being in front or in the back to TP1. In total, it can be write $$l_1 \in [I_{s,1}, I_{e,1}] \hat{} l_2 \in [I_{s,2}, I_{e,2}] \rightarrow \quad (2)$$

front: $l_1 < l_2$, back: $l_1 > l_2$.

For the lateral case, the trajectories meet in the future. With respect to the difference angle Δλ of the interaction start $I_{s,1}$ and $I_{s,2}$, TP2 is to the right or left depending on its value in compliance with $$\angle I_{s,1}, I_{e,2} = \gamma_{s,1} - \gamma_{s,2} = \Delta \gamma_s, \quad (3)$$

right: $\Delta \gamma_s \in (0, \pi)$, left: $\Delta \gamma_s \in (\pi, 2\pi)$.

All possible interactions for TP1 driving fixed from the bottom to the top on X-intersections are summarized in FIG. 11.

Besides TP's driving on the same path, the trajectory of TP2 can intersect, be curved before or after, and merge with trajectory of TP1. For front-before-back, TP2 is superior in front and inferior in back relations. Analogously, right-before-left determines TP2 as superior for right and inferior for left contexts. In other countries with left-before-right, the order assignment is switched.

The invention claimed is:

1. A method for use in a driver assistance system of an ego-vehicle, the method supports driving of the ego-vehicle and comprises the steps of:
   sensing at least one other traffic participant involved in a traffic situation in the environment of the ego-vehicle;
   determining a priority relationship between the ego-vehicle and the at least one other traffic participant;
   selecting a prediction model for predicting a future behavior of the at least one traffic participant based on the determined priority relationship;
   predicting at least one hypothetical future trajectory for the ego-vehicle, and, based on the selected prediction model, the future behavior for the at least one traffic participant;
   calculating a behavior relevant score for ego-vehicle based on the at least one calculated hypothetical future trajectory of the ego-vehicle and the predicted future behavior of the other traffic participant; and
   determining a behavior of the ego-vehicle based on the calculated behavior relevant score and outputting a signal for controlling the ego-vehicle to perform the determined behavior; wherein
   in the determining step, it is determined whether or not the at least one hypothetical future trajectory of the ego-vehicle and a trajectory of the predicted behavior of the at least one other traffic participant intersect or merge, and a prediction model defining a delayed change of velocity for the at least one other traffic participant within a prediction interval is selected in the selecting step when the at least one hypothetical future trajectory of the ego-vehicle and the trajectory of the predicted behavior of the at least one other traffic participant intersect or merge; wherein
   in the determining step, it is determined whether the ego-vehicle has right of way over the at least one other traffic participant or the at least one traffic participant has right of way over the ego-vehicle, and a delayed decrease of velocity as said delayed change of velocity is selected in the selecting step when the ego-vehicle has right of way over the at least one other traffic participant and a delayed increase of velocity as said delayed change of velocity is selected in the selecting step when the at least one traffic participant has right of way over the ego-vehicle; and wherein
   in said prediction model defining the delayed change of velocity, the velocity changes up to a predetermined value or for a predetermined period and is then constant for the rest of the prediction interval.

2. The method according to claim 1, wherein
   in the determining step, the priority relationship is estimated based on road maps indicating priority at intersections, junctions and roundabouts, or based on road signs or traffic lights detected by at least one optical sensor of the ego-vehicle.

3. The method according to claim 1, wherein
in the determining step, it is determined whether or not the ego-vehicle and the at least one other traffic participant follow the same path; and
a prediction model defining a constant velocity during a prediction interval for the at least one traffic participant is selected in the selecting step when the ego-vehicle and the at least one other traffic participant follow the same path.

4. The method according to claim 1, wherein
in the selecting step, at least one of the predetermined value, delay and change of the velocity is set based on at least one of road conditions, road geometry, weather conditions, speed limit, type or state of the at least one traffic participant, type or state of the ego-vehicle, distance between the ego-vehicle and the at least one traffic participant, and a speed with which the ego-vehicle and the at least one traffic participant move towards each other.

5. The method according to claim 1, wherein
the behavior relevant score is calculated as risk and indicates, for the hypothetical future trajectory of the ego-vehicle, collision probability, collision severity, product of collision probability and collision severity, Time-of-Closest-Encounter, Time-To-Closest-Encounter, Position-of-Closest-Encounter or Distance-of-Closest-Encounter.

6. The method according to claim 1, wherein
the behavior relevant score is a function over the time within the prediction interval and, in the calculating step, the behavior relevant score is modulated based on a function monotonically decreasing over the time within the prediction interval.

7. The method according to claim 6, wherein
in the calculating step, functional form or parameters of the monotonically decreasing function are set based on at least one of the priority relationship, road conditions, road geometry, weather conditions, speed limit, type or state of the at least one traffic participant, type or state of the ego-vehicle, distance between the ego-vehicle, and the at least one traffic participant and a speed with which the ego-vehicle, and the at least one traffic participant move towards each other.

8. The method according to claim 1, wherein
the behavior relevant score is recalculated repetitively to adjust the behavior relevant score to changes in the traffic situation.

9. The method according to claim 1, further comprising the step of:
optimizing the behavior relevant score by varying a velocity profile for the at least one hypothetical future trajectory of the ego-vehicle, wherein the behavior is determined based on the velocity profile of the optimized behavior relevant score.

10. A driver assistance system configured to carry out the method according to claim 1.

11. A vehicle comprising the driver assistance system according to claim 10.

* * * * *